Nov. 19, 1968   G. LONG   3,411,268
BAG CLOSING APPARATUS
Filed Oct. 7, 1964   5 Sheets-Sheet 1
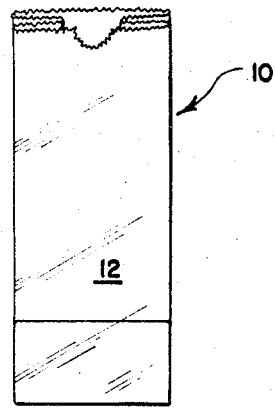
FIG. IA
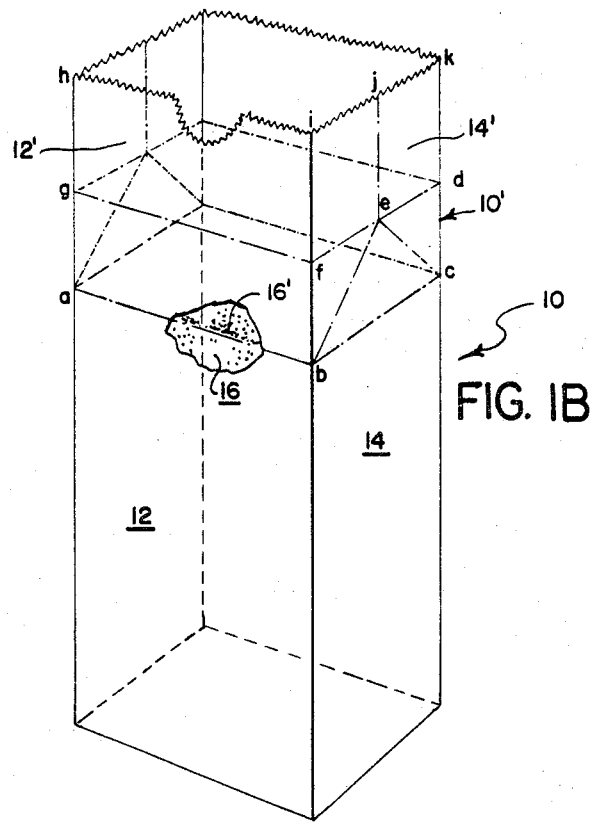
FIG. IB
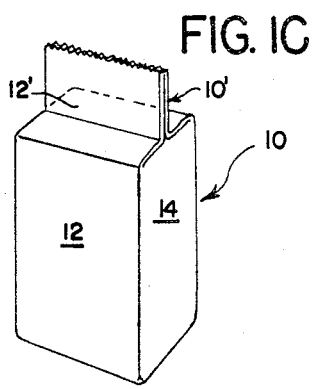
FIG. IC
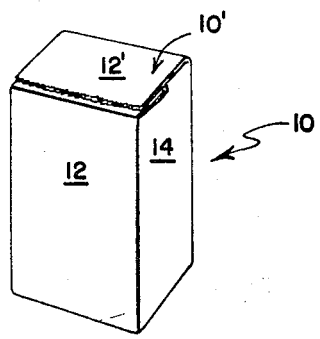
FIG. ID
INVENTOR.
GEORGE LONG
BY
ATTORNEY INVENTOR.
GEORGE LONG
BY
Robert B. Hughes
ATTORNEY Nov. 19, 1968 G. LONG 3,411,268
BAG CLOSING APPARATUS
Filed Oct. 7, 1964 5 Sheets-Sheet 3

INVENTOR.
GEORGE LONG
BY *Robert B. Hughes*
ATTORNEY

INVENTOR.
GEORGE LONG
BY Robert B. Hughes
ATTORNEY

Nov. 19, 1968  G. LONG  3,411,268

BAG CLOSING APPARATUS

Filed Oct. 7, 1964  5 Sheets-Sheet 5

INVENTOR.
GEORGE LONG

BY Robert B. Hughes

ATTORNEY

United States Patent Office 3,411,268
Patented Nov. 19, 1968

3,411,268
BAG CLOSING APPARATUS
George Long, Minneapolis, Minn., assignor to General Mills, Inc., a corporation of Delaware
Filed Oct. 7, 1964, Ser. No. 402,239
5 Claims. (Cl. 53—371)

This invention relates to a method and apparatus for closing bags.

It is a principal object of the present invention to provide such a method and apparatus, whereby paper bags are neatly and consistently folded down without any substantial amount of wrinkling.

It is a further object to provide such a method and apparatus which is practical and efficient in a commercial operation.

These and other objects and features of the invention will be more readily understood and appreciated from the following detailed description of the preferred embodiments thereof selected for purposes of illustration and shown in the accompanying drawings, in which:

FIGURES 1A through 1D show a bag of the type which is closed by the machine of the present invention, through successive stages of a complete closing operation, with FIGURE 1B showing in broken lines the approximate lines along which the bag is folded according to the present invention;

FIGURE 6 is a fragmentary transverse sectional view taken along the same plane as FIGURE 4, also drawn to an enlarged scale and showing only the upper closure portion of the apparatus in its closed down position;

Figure 2:
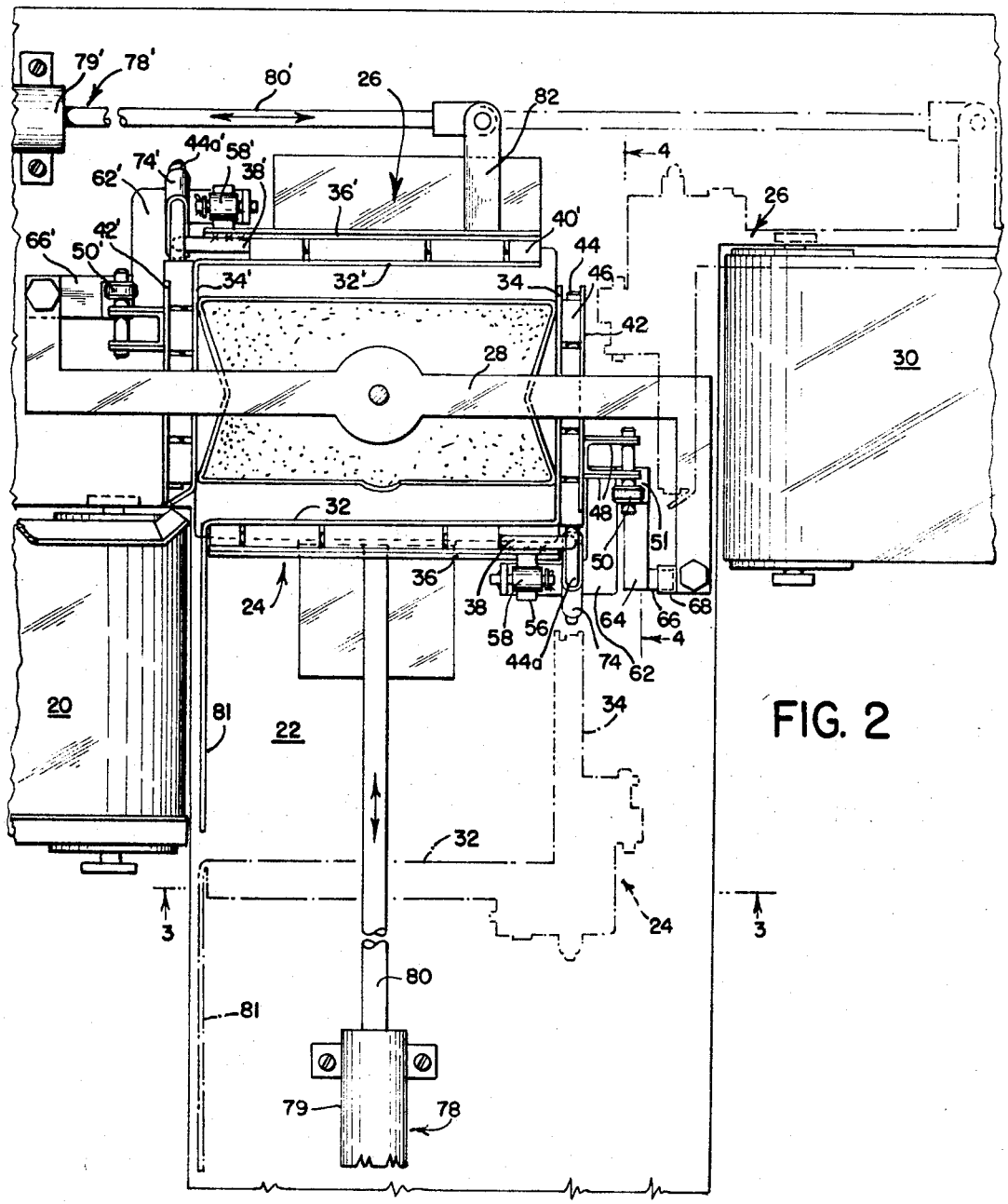
FIGURE 2 is a top plan view of the apparatus of the present invention, taken generally along line 2—2 of FIGURE 3.

FIGURES 8 and 9 are perspective schematic drawings to illustrate the operation of the closure mechanism of the present invention, FIGURE 8 showing such closure mechanism before it has folded down the bag, and FIGURE 9 showing the same after the bag has been folded down, and FIGURE 10 is a perspective schematic drawing, somewhat similar to FIGURES 8 and 9, showing a second embodiment of the present invention.

It is believed a clearer explanation of the present invention will be achieved if the detailed description thereof is preceded by a brief discussion of the problems encountered in closing a filled paper bag and of the general approach taken in the present invention to solve such problems.

By referring to FIGURES 1A–1D, wherein is shown the type of bag which is folded down by the apparatus of the present invention, it can be seen that the make-up of the bag and the configuration to which it is folded are both conventional. Such bags come prefolded in the manner shown in FIGURE 1A. In the overall packaging operation, each bag is opened to assume the general configuration of a rectangular prism, and a predetermined portion of the product to be packaged is then poured into the bag up to a certain level (as shown in FIGURE 1B), after which the top portion of the bag is folded in the manner shown in FIGURE 1C. With the bag in the folded configuration of FIGURE 1C, further operations such as cutting off the top of the bag, sewing and/or taping the bag can be performed. Finally, the bag can, if desired, be folded over so as to be adjacent the top level of the contained product (as shown in FIGURE 1D).

The operation of folding the bag from the open configuration of FIGURE 1B to the position of FIGURE 1C is especially critical in obtaining a neat and proper closure, and it is with this portion of the bag closing operation that the present invention is especially concerned.

Probably the main source of difficulty in folding the bag so as to get a neat closure without any substantial wrinkling is that when a granular product is poured into the bag, the sides of the bag will bulge out so that a section taken horizontally through the bag at the middle or top portion thereof will have a somewhat oval or rounded configuration. The difficulties which this bulging creates are best understood by examining FIGURE 1B which illustrates a bag having a configuration of a perfect rectangular prism (i.e. without any such bulging) and showing in broken lines the fold lines along which the bag would be folded in an ideal situation to obtain a perfectly neat closure. This bag is designated generally by numeral 10, and the side and end panels thereof are designated 12 and 14, respectively. The level to which the product 16 is filled in the bag 10 is designated 16′, and the portions of panels 12 and 14 which extend above the product level 16′ (these being the closure portion of the bag 10), are accordingly designated 12′ and 14′, respectively, and collectively are designated 10′.

Letter designations for the points at which the various fold lines intersect have been applied only on the front and side panel closure portions 12′ and 14′ which are wholly exposed in FIGURE 1B. In the following description, when such letter designations are used in defining various lines and parts of the panel closure portions 12′ and 14′, the line or part so defined by certain letters on one panel portion 12′ or 14′ is also intended to refer to the corresponding line or part on the opposite panel closure portion 12′ or 14′.

The "hinge lines," $a$, $b$ and $b$, $c$, along which the sides 12 and end panels 14 are folded in, coincide with the product level 16′. Each triangular portion $b$, $e$, $c$ is folded flat against the product 16, and is overlaid by triangular portions $b$, $e$, $f$ and $c$, $e$, $d$ to form reentrant folds along diagonal lines $b$, $e$ and $c$, $e$; the rectangular portions adjacent the hinge line $a$, $b$ (one of which is defined by points $a$, $b$, $f$, $g$) overlie these triangular portions, and also lie adjacent to the top level 16′ of the product 16. The rectangular portion $g$, $f$, $i$, $h$ of panel 12 and its corresponding rectangular portion from the other side panel 12 are caused to be moved in adjacent one another so as to be upstanding from the longitudinal center line of the bag closure, and the uppermost rectangular portions (one of which is seen to be defined by points $f$, $d$, $k$, $i$) of the end panels 14 are contained between the side panel rectangles $g$, $f$, $i$, $h$, and are formed with a reentrant fold, as along line $e$, $j$.

However, when the open bag 10 is filled so that the product 16 causes the panels 12 and 14 of the bag 10 to bulge, it is apparent that the straight-lined geometric figures defined by the above recited fold lines will suffer some distortion. Notably, the rectangle, $a$, $b$, $f$, $g$ of each side panel 12 will curve outwardly, and when it is attempted to fold in each rectangle $a$, $b$, $f$, $g$ along its hinge line $a$, $b$, wrinkles will form, especially near the end portions of the rectangle where the curvature is greatest.

Recognition of this problem suggests a possible solution that during the closing operation the sides of the bag be restrained in such a manner that the bag assumes the rectangularly prismatic shape from which a perfect closure fold can be made. However, after the bag is closed and after it is no longer restrained in this prismatic shape, with only moderate jostling in the subsequent handling of the bag, the product settles in the bag to bulge out the sides thereof and the product level drops away from closure portion of the bag. With the resulting "loose pack" of the product, the top of the bag easily becomes crushed down, and the appearance of the bag, when it does reach the final consumer, is less than wholly desirable. Also, if the product in such that it is easily blown by air currents, the air pocket which forms at the top of the bag can be a source of "sifting." That is to say, pressure applied to the top of the bag will cause air turbulence in the void or air pocket in the top of the bag, and the product can be blown out through small passages which are sometimes present in the closure portion of the bag.

The practical approaches to this dilemma have varied. One is simply to permit the product to bulge the sides of the bag outwardly and make a loose closure at the top of the bag (i.e. the closure assuming a tent-like configuration), which closure may be crushed down in subsequent handling. Another has been to make a tight pack and accept the fact that there will be wrinkles formed in the same. Also different types of closures have been attempted, with varying degrees of success. There are, of course, many other problems which arise when it is attempted to close the bags mechanically in a commercial operation. Among these are properly orienting the bag in the machine, handling the filled bags in such a way as not to disturb the level of the product in the bag, and many other problems relating to the mechanics of engaging the bag, folding the same, etc.

In the present invention, the middle and lower portions of each bag are permitted to bulge outwardly to form a tight pack, while the upper portion of the containing walls of the bag is squared up to some extent. By then applying proper folding techniques (to be described hereinafter), each bag can consistently be folded down neatly so that a "tight pack" is achieved without any significant amount of wrinkling of the bag.

Figure 3:
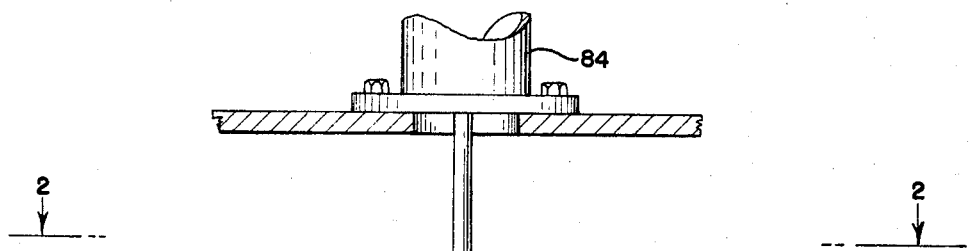
FIGURE 3 is a view taken generally in side elevation, along line 3—3 of FIGURE 2.
Figure 5:
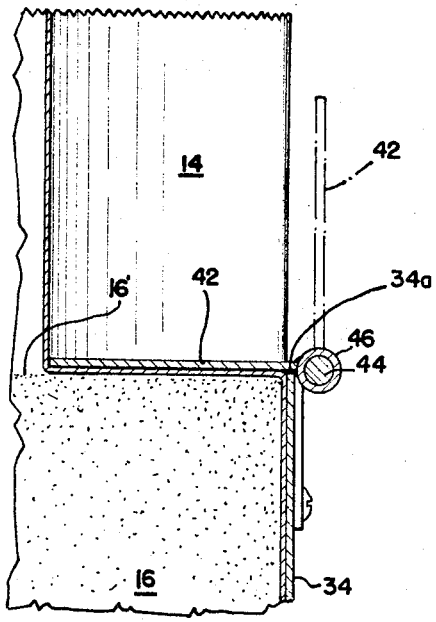
FIGURE 5 is an enlarged, fragmentary, longitudinal sectional view taken along line 5—5 of FIGURE 4, but showing the apparatus in its closed down position.
Figure 4:
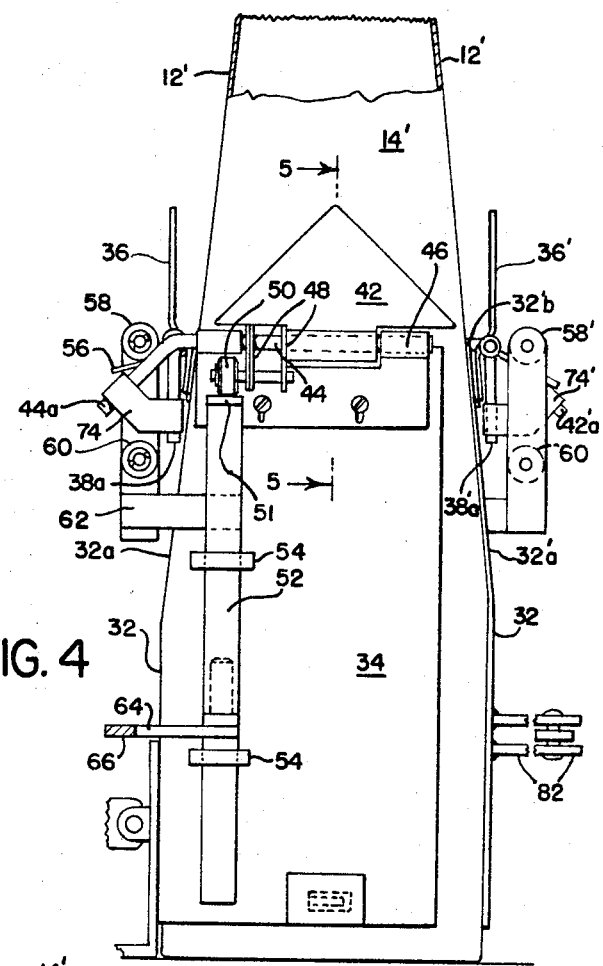
FIGURE 4 is a transverse sectional view taken on line 4—4 of FIGURE 2.
Figure 7:
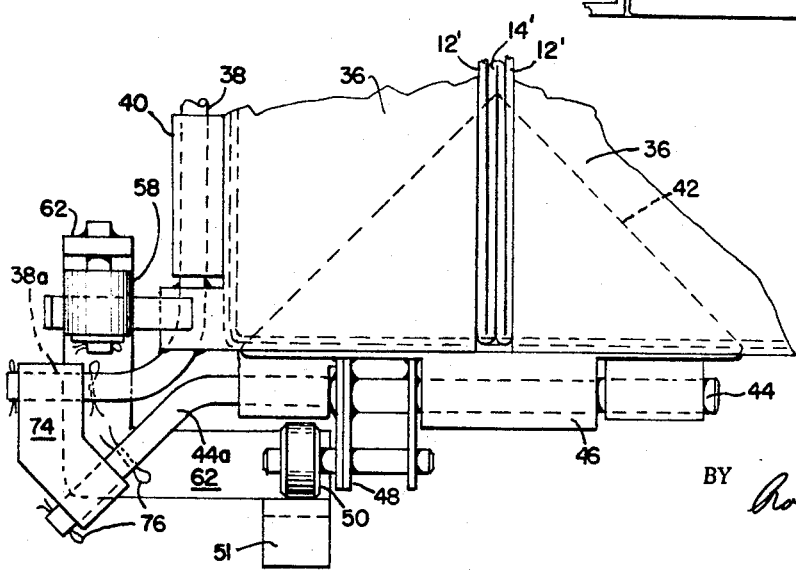
FIGURE 7 is a fragmentary plan view, taken generally from the plane indicated at 7—7 of FIGURE 6, drawn to the same scale as FIGURE 6, and showing the front part of the closure portion of the present invention.

Reference is made to FIGURE 2, which shows the apparatus of the present invention in top plan view. In general, this apparatus comprises a forward moving infeed belt conveyor 20 which moves each bag 10 to a location on a support platform 22, this bag location being called a "pre-folding" station. Here a first bag collapsing unit, generally designated 24, engages the bag 10 and moves it transversely to a collapsing station where the bag comes into contact with a second bag collapsing unit 26. (It is in this stage of the operation that the apparatus is shown in FIGURES 2 through 4.) At this instant, these two units 24 and 26 contain the bag 10 an all of its four sides 12 and 14, with the units 24 and 26 thus defining a pocket for the bag 10. While the bag 10 is so contained, an actuating bar 28 is moved vertically to cause certain collapsing member (to be described more fully hereinafter) mounted onto units 24 and 26 to engage the closure portions 12' and 14' and collapse the bag 10. (This position of the apparatus is shown in FIGURES 5 through 7.) Subsequent to this, the actuating bar 28 descends to move these hereinafter described collapsing members to their initial position; the first collapsing unit 24 retracts; and the second collapsing unit 26 moves the bag forward onto a discharge conveyor 30, which carries the bag 10 from the present machine to some other device which may perform some further closure operation such as sewing, taping, and/or gluing the bag 10.

In construction and function, the first collapsing unit 24 and the second collapsing unit 26 are quite similar, and like numerical designations will be given to corresponding parts of the two units, with a prime (') designation distinguishing those of the second collapsing unit 26.

The collapsing unit 24 comprises a vertical longitudinally aligned side-wall 32 and a vertical transversely aligned front end wall 34 fixedly connected by an edge portion thereof to the front edge of the side wall 32 and extending at right angles thereto towards the other unit 26. The upper portion 32a of the side wall 32 slants inwardly to a moderate degree so that the upper portion of the bag 10 is squared up to some degree while the lower portion thereof is permitted to bulge outwardly.

Hinge mounted to the upper edge 32b of the side wall 32 is a rectangular side plate 36 which, during the closure operation of the apparatus functions to fold a side wall closure portion 12' of a bag 10 in and down. The side plate 36 is welded or otherwise fixedly secured to a hinge pin 38 of a hinge 40 in a manner that its lower edge 36a is proximate to and parallel with the upper edge 32b of the side wall 32.

Also, there is hinge mounted to the upper edge 34a of the front end wall 34 a "delta" plate 42 which functions to tuck or fold a related front end wall closure portion 14' in and down. This end plate 42 has the general configuration of a right isosceles triangle, the hypotenuse edge 34a of which is proximate and parallel to the upper edge 34a of the front end wall 34, and is welded by its edge 42a to a hinge pin 44 of its hinge mounting 46.

Fixed to and extending outwardly from the plane of the end plate 42 is a pair of fingers 48 which carries a cam roller 50. To engage this cam roller 50 so as to cause the tucker plate 42 to swing inwardly and down, there is provided a lug 51 secured to a cam bar 52 which is mounted for vertical slide motion, as by brackets 54, to the outside surface of the front end wall 34.

There is fixedly secured to the side fold down plate 36 a cam finger 56 extending generally outward from the plane of the fold down plate 36. To engage this cam finger 56, there is provided an upper and a lower cam roller 58 and 60, respectively, both of which are mounted to an arm 62 which is fixably secured to the aforementioned cam bar 52. Fixably secured to and extending laterally from the cam bar 52 is a lug 64, the outer end of which has a forward protrusion 66, which reaches between, in a tongue and groove arrangement, upper and lower protrusions 68 and 70 formed integrally with a depending arm 72 secured to the aforementioned actuating bar 28. Thus raising the bar 28 causes the bar 53 to engage its associated cam roller 50, and the lower cam roller 60 to engage its related cam finger 56, while lowering the bar 28 causes the upper cam roller 58 to engage the cam finger 56 on its downstroke to depress the same.

Of particular significance in the present invention is the manner in which the fold-down plate 36 is linked to the tucker plate 42 so that the two move in proper relationship with respect to one another. The hinge pin 44 of the tucker plate 42 is extended moderately beyond the line at which the planes of the side and end walls 32 and 34 intersect and is bent at this line of intersection at a 45° angle in a plane coinciding with the plane of the tucker plate 42 so as to be aligned with a proximate edge line which forms one of the two equal sides of the triangle of the tucker plate 42. Also, the hinge pin 38 of the side fold-down plate 36 is extended to the line of intersection of walls 32 and 34 where it is bent at a right angle away from its related plate 36, and in the same plane as that occupied by its associated fold-down plate 36 so as to be aligned with the front edge portion thereof. These two extensions of the hinge pins 44 and 38 are designated, respectively, 44a and 38a, and are joined one to another by a rigid link 74 sleeved to each of the members 44a and 38a. Cotter pins 76 are provided to hold the link 74 at the desired locations along both hinge pin extensions 44a and 38a. The significance of this linkage will be disclosed more fully hereinafter in a discussion of the operation of this machine, and it is believed sufficient at this point merely to indicate that the general function of this linkage is to cause the plates 32 and 34 to move in a predetermined manner with respect to one another.

To move the first collapsing unit 24 transversely, there is provided an air cylinder and piston unit 78, the air cylinder 79 of which is fastened to the platform 22, and the rod 80 being secured to the side wall 32 of the unit 24. Althouggh not shown herein, it is to be understood that appropriate guide means would be provided for the first collapsing unit 24 to keep the same or its proper transverse path during its cycles of reciprocation. Fixedly secured to the rear edge of the side plate 32 is a transverse hold arm 81 which prevents a bag 10 from moving into the reciprocating path of the unit 24 when the same is pushing another bag transversely to the other collapsing unit 26.

As indicated previously, the second collapsing unit 26 is in general the same as the first collapsing unit 24 and thus has a side wall 32' and rear end wall 34' carrying, respectively, plates 36' and 42', these components being similar to those components of the bag collapsing unit 24 which have similar numerical designations. It is believed any detailed description of the unit 26 would be redundant, since a sufficiently clear understanding of the same can be attained by referring to the description of the unit 24 and applying such description to the components of the unit 26 bearing like numerical designations.

It will be noted that the actuating bar 28 has a second depending arm 72' having a pair of protrusions 68' and 70' which defines a groove to engage a protrusion 66' on the cam bar 52' of the unit 26. Also, there is a second air cylinder and piston unit 78', the cylinder 79', of which is secured to a frame of the machine and the piston rod 80' of which is secured to the side wall 32' of the second collapsing unit 26 by means of a bracket 82. However, this cylinder 78' is longitudinally aligned so that the reciprocating motion it imparts to the second collapsing unit 26 is forwarded and then back. The up and down movement of the actuating bar 28 is accomplished by suitable means, such as the surmounting air cylinder and piston unit 84 shown in FIGURE 3. Although not shown herein, suitable guide means would be provided for the actuating bar 28 and for the second collapsing unit 26 so as to direct these components along their respective reciprocating paths.

In operation, the first collapsing unit 24 is initially in a retracted position, as shown in broken lines in FIGURE 2. Each bag 10 to be closed is fed by the conveyor belt 20 onto the platform 22, with the front panel 14 of the bag 10 coming into contact with the front wall 34 of the first collapsing unit 24 so that the bag 10 is stopped at the proper location. As each bag reaches this position, the air cylinder 78 is actuated to move the first collapsing unit 24 transversely toward the second collapsing unit 26. (This can either be done manually or by other means, such as a contact switch mounted on the front wall 34.) This brings the bag 10 into contact with the second collapsing unit 26. (This operating position of the apparatus is, as indicated previously, illustrated in FIGURES 2 through 4.) At this instant, the two side panels 12 and the two end panels 14 of the bag 10 are contained by, respectively, the two side walls 32 and 32' and the two end walls 34 and 34', the walls 32, 32', 34 and 34', thus defining a pocket to contain the four side walls 12 and 14 of the bag 10. Since the upper portions 32a and 32a' of the walls 32 and 32' are tapered inwardly, the upper portions of the side walls 12 of the bag 10 are pressed inwardly so that the portion of the bag 10 at the top level 16' of the product 16 is squared up to a moderate extent, while the lower portion of the bag 10 is permitted to bulge outwardly. Also it will be noted that this transverse motion of the unit 24 causes the member 66 to slip between the protrusions 68 and 70, so that the actuating bar 28 becomes operatively engaged with the cam bar 52.

Next, the air cylinder and piston unit 84 causes the actuating bar 28 to rise so as to cause the tucker plates 42 and 42' and the side plates 36 and 36' to move inwardly and thus perform their folding function, and then lowers the bar 28 so as to return the plates 36, 36', 42 and 42' to their initial positions. (This can be done either by manually activating the air cylinder 82 or automatically as by activating the same by means of a contact switch mounted on the side plate 36' of the second collapsing unit 26.)

This collapsing action of the side plates 36 and 36' and the tucker plates 42 and 42' is especially critical in the present invention, and it is believed the same will be better understood by referring to FIGURES 8 and 9, in conjunction with FIGURE 1B. The triangular configuration of each tucker plate 42 and 42' is congruent with the triangular fold portion b, e, c of its related closure portion 14' of the panels 14 of the bag 10, while the rectangular configuration of the side plates 36 and 36' are congruent with rectangles a, b, f, g of the side panels closure portions 12 and 12'. The hinge line (i.e., axis of rotation) of each of the tucker plates 42 and 42' is placed as close as possible to the line b, c on the bag 10, so that each tucker plate 42 and 42' is superimposed against its corresponding bag portion b, c, e so as to coincide therewith. In like manner, the hinge line of each side plate 36 and 36' is brought as close as possible to its related line a, b so that each side plate 36 and 36' is in like manner superimposed against its corresponding rectangle a, b, f, g so as to coincide therewith. For clarity of description, in FIGURES 8 and 9, only the plates 36 and 42 are shown, it being understood that the action of the other plates 36' and 42' is the same as their corresponding plates 36 and 42, and the point designations of the bag portions a, b, f, g and b, c, e are used to denote coinciding points on the plates 36 and 42 with a prime (') designation distinguishing the latter points.

It can be seen from examining FIGURES 8 and 9 that the hinge pin extension 44a is a prolongation of the line e', b', while the hinge pin extension 38a is a prolongation of the line f', b'. Since the angular relationship between the hinge pin extensions 38a and 44a are fixed with respect to one another, the 45° angle therebetween is fixed which likewise fixes the angle f', b', e' at 45°. The result is that as the plates 36 and 42 are moved in their folding motion, the configuration of the triangle defined by points f', b', e' remains constant. The result is that not only is the end panel closure portion 14' broken along the proper fold lines as shown in FIGURE 1B, but the side plate 36 is moved in and down in such a manner in relation to the tucker plate 42 that the distance f', e' remains constant. Thus this folding action causes no distortion of the bag 10 within triangular portions b, e, f and c, e, d as well with the other portions of the bag 10 defined by the fold lines thereof. This spaced relationship between the plates 36 and 42 is maintained all the while that these plates 36 and 42 are coming down to a horizontal position proximate the top level 16' of the product 16.

As indicated previously, the folding action of the plates 36, 36', 42 and 42' is caused by raising the actuating bar 28. As the bar 28 moves upwardly, the cam lug 51 engages the cam roller 50 to apply torque along the axis of the hinge mounting 46 to the tucker plate 42 to cause the same to rotate inwardly and down. Since the tucker plate 42 is connected to its related side plate 36 by the link 74, this in and down movement of the tucker plate 42 causes the side plate 36 also to begin to swing down. (At the same time, the lug 51' is performing a similar function with respect to the tucker plate 42'.) The tucker plate 42 precedes the fold down plate 36 in moving downwardly toward the plane of the product level 16', and consequently, the tucker plate 42 has traveled the greater part of its 90° arcuate path of its fold down motion before the side plate 36 has moved to any great extent from its vertical position. Consequently, after the lug 51 has caused the tucker plate 42 to move through about two-thirds of its path of travel, the lower cam roller 60 engages its corresponding cam finger 56 to apply torque to the side plate 36 along the axis of the hinge 40 to cause the side plate 36 to move down to a horizontal position over the tucker plate 42 (and also over the tucker plate 42′) and proximate the product level 16′. (This is the position shown in FIGURES 5 through 7 and shown schematically in FIGURE 9.) It will be noted that in this operating position, the plates 36 and 42, as well as the hinge extensions 38a and 44a are all horizontally disposed and occupy nearly the same horizontal plane.

When the actuating bar 28 has reached the upper limit of its stroke, the two side plates 36 and 36′ are pressed firmly against the corresponding rectangular portions a, b, f, g of the two side panel closure portions 12′ so as to crease the bag 10 along the fold lines illustrated as broken lines in FIGURE 1B and fold the bag 10 to the position shown in FIGURE 1C. After this, the actuating bar 28 descends, so that the upper cam roller 58 engages its related cam finger 56 to lift the side plate 36 to its vertical position, and by virtue of the linkage 74, also to move the tucker plate 42 to its vertical position. (In like manner, the upper cam roller 58′ engages its related finger 56′ to raise the plates 36′ and 42′.)

Next, the air cylinder 78 is activated to retract the first collapsing unit 24, after which the air cylinder 78′ is actuated to push the second collapsing unit 26 forward to move the bag 10 from the folding station onto the discharge conveyor 30. The air cylinder 78′ then retracts the second collapsing unit 26, and the apparatus is then ready to receive a second bag 10 to collapse the same.

When the plates 36, 36′, 42 and 42′ are moved up to their initial vertical positions, the closure portion 10′ of the bag 10 will spring away to some degree from its collapsed position. However, the closure portion 10′ of the bag 10 has sufficient "memory" so that it will remain creased along the proper fold lines, and when the bag 10 is again pushed down to its fully collapsed position, it will fold along these same lines to form a neat closure. Such subsequent folding could be done in various ways, for example by a pair of side plates, such as those shown at 36 and 36′, without the tucker plates 42 and 42′, or by a pair of "plow arms" which engage the bag as it moves on a conveyor and functions to press the bag down to its fully collapsed position. With the bag so collapsed, other closure operations, such as sewing, taping, and/or gluing can be performed.

It is to be understood that the coordinated motion between the tucker plates 42 and 42′ and the side plates 36 and 36′ can be accomplished by means other than the precise linkage shown in FIGURES 2 through 9. One such other arrangement is illustrated schematically in FIGURE 10, which can properly be considered to be a second embodiment of the present invention. In disclosing this second embodiment, no attempt has been made to show all the components which would make up a complete working machine made according to this second embodiment, since the various components shown in the first embodiment could easily be incorporated with some modification in this second embodiment to perform similar functions. This would present no problem to the skilled mechanic, and hence it is believed that a clearer disclosure of this second embodiment is attained merely by disclosing the same schematically.

In this second embodiment, there are provided four plates, two of which are shown at 36″ and 42″, these plates being similar both in structure and function to the plates 36, 36′, 42 and 42′. However, the hinge pins 38″ and 44″ of, respectively, plates 36″ and 42″ are prolonged outwardly away from the location of the intersection of the planes of the plates 36″ and 42″, and are fixed to, respectively, sprockets 86 and 88. The sprockets 86 and 88 mesh with, respectively, chains 90 and 92, which in turn engage respective sprockets 94 and 96. The sprocket 94 is fixed to a pin 98 which corresponds to and is parallel with the hinge pin 38″, while the sprocket 96 is fixed to a pin 100 corresponding to and parallel to the hinge pin 44″. At the point where the pins 98 and 100 intersect, the pin 100 is bent 90°, and the pin 100 is 45° to form angled prolongations 98a and 100a respectively. These are arranged with respect to one another and are joined by a link 102 in the same manner that the hinge pin prolongations 38a and 44a of the first embodiment are arranged and joined by the link 74.

The mode of operation of this second embodiment is substantially the same as the first embodiment. Torque is first applied along the axis of the hinge pin 44′ to cause the tucker plate 42″ to swing inwardly and down. Next, torque is applied about the axes of the hinge pin 38″ to cause the side plate 36″ to swing down and against the other plate 42″. The relative movement of the plates 36″ and 42″ is coordinated by the link 102, in the same manner as the link 74 controls the movement of the plates 36 and 42 in the first embodiment. As indicated previously there is a second set of plates (not shown) similar to plates 36″ and 42″ to cooperate therewith in closing the bag 10.

It should be understood that the foregoing is merely illustrative of a certain embodiment of the invention and many variations may be made by those skilled in the art without departing from the spirit and scope of the invention.

I claim:

1. An apparatus to collapse a bag which is filled to a predetermined level, said bag comprising two side panels and two end panels, said bag to be folded in such a manner that said end panels are tucked in and said slide panels are folded down and over portions of said end panels, said end panels each being folded along a respective hinge line generally proximate said predetermined level, and being formed with two reentrant folds along two diagonal lines reaching from approximately opposite ends of its related hinge line and joining at an apex point, the portion of each end wall defined by its related hinge line and two diagonal lines being a triangular fold piece, said side panels being folded each along a respective hinge line generally proximate said predetermined level so that two generally rectangular portions, one from each side panel, are folded down to overlie the triangular fold pieces of said two end walls, said apparatus comprising:

(a) two tucker members each of which has edge means to engage a related one of said end panels along the diagonal fold lines thereof to move its related triangular fold piece inwardly and down;

(b) two side folding members each of which engages a related one of said side panels at said rectangular portion thereof, said side folding members moving said two rectangular portions down and over said triangular fold pieces, and (c) means to move said tucker members and side folding members inwardly and down in relationship to each other, so that the distance between that part of each tucker member that is adjacent the apex point of its proximate end panel and the part of each side folding member that is adjacent a proximate edge portion of the rectangular portion of its adjacent side panel, which edge portion is perpendicular to the hinge line of its related rectangular portion, remains constant.

2. An apparatus to collapse a bag which is filled to a predetermined level, said bag comprising two side panels and two end panels, said bag to be folded in such a manner that said end panels are tucked in and said side panels are folded down and over portions of said end panels, said end panels each being folded along a respective hinge line generally proximate said predetermined level, and being formed with two reentrant folds along two diagonal lines reaching from approximately opposite ends of its related hinge line and joining at an apex point, the portion of each end wall defined by its related hinge line and two diagonal lines being a triangular fold piece, said side panels being folded each along a respective hinge line generally proximate said predetermined level so that two generally rectangular portions, one from each side panel, are folded down to overlie the triangular fold pieces of said two end walls, said apparatus comprising:

(a) two tucker members each of which has edge means to engage a related one of said end panels along the diagonal fold lines thereof to move its related triangular fold piece inwardly and down, (b) two side folding members each of which engages a related one of said side panels at said rectangular portion thereof, said side folding members moving said two rectangular portions down and over said triangular fold pieces, (c) said side folding members and said tucker members each being swing mounted about a respective axis adjacent to the hinge line of a respective proximate bag panel, and (d) means to move said tucker members inwardly and down and to move said side folding members inwardly and down over said tucker member so as to fold said bag as described hereabove, said mover means being such that the distance between that part of each tucker member that is adjacent the apex point of its proximate end panel and that part of each side folding member that is adjacent proximate edge portion of the rectangular portion of its adjacent side panel, which edge portion is perpendicular to the hinge line of its related rectangular portion, remains constant.

3. An apparatus to collapse a bag which is filled to a predetermined level, said bag comprising two side panels and two end panels, said bag to be folded in such a manner that said end panels are tucked in and said side panels are folded down and over portions of said end panels, said end panels each being folded along a respective hinge line generally proximate said predetermined level, and being formed with two reentrant folds along two diagonal lines reaching from approximately opposite ends of its related hinge line and joining at an apex point, the portion of each end wall defined by its related hinge line and two diagonal lines being a triangular fold piece, said side panels being folded each along a respective hinge line generally proximate said predetermined level so that two generally rectangular portions, one from each side panel, are folded down to overlie the triangular fold pieces of said two end walls, said apparatus comprising:

(a) two tucker members each of which has edge means to engage a related one of said end panels along the diagonal fold lines thereof to move its related triangular fold piece inwardly and down, (b) two side folding members each of which engages a related one of said side panels at said rectangular portion thereof, said side folding members moving said two rectangular portions down and over said triangular fold pieces, (c) said side folding members and said tucker members each being swing mounted about a respective axis adjacent to the hinge line of a respective proximate bag panel, (d) means to move said tucker members inwardly and down and to move said side folding members inwardly and down over said tucker member so as to fold said bag as described hereabove, and (e) means interconnecting each side folding member and a related tucker member, which interconnecting means permits swing movement of each tucker member and each side member, while keeping constant the spaced angular relationship between one diagonal edge of each tucker member and that part of its interconnecting side folding member that is proximate to said diagonal edge.

4. The apparatus as recited in claim 3, wherein said interconnecting means comprises a first linkage member which is fixed to a related tucker member and is a prolongation of its said one diagonal edge, a second linkage member fixed to its interconnected said member and being a prolongation of a line lying in the general plane of its related side member and perpendicular to the axis of swing motion of said second member at a point proximate its interconnected tucker member, and a third linkage member interlinking said first and second linkage members so as to maintain the spaced angular relationship thereof constant.

5. The apparatus as recited in claim 3, wherein said interconnecting means comprises a first linkage member which is interconnected to a related tucker member so as to maintain a predetermined spatial relationship with respect thereto, a second linkage member interconnected to a related side folding member so as to maintain a predetermined spatial relationship with that portion of said side folding member proximate said related tucker member, and a third linkage member interlinking said first and second linkage members so as to maintain the angular relationship thereof constant.

References Cited

UNITED STATES PATENTS

| 2,093,136 | 9/1937 | Orstrom | 53—371 |
| 2,911,778 | 11/1959 | Ozor | 53—44 X |
| 2,925,695 | 2/1960 | Fry | 53—45 |

TRAVIS S. McGEHEE, *Primary Examiner.*